(12) United States Patent
Ishigo et al.

(10) Patent No.: US 8,714,824 B2
(45) Date of Patent: May 6, 2014

(54) BEARING APPARATUS FOR CRANKSHAFT OF INTERNAL COMBUSTION ENGINE

(71) Applicant: Daido Metal Company Ltd., Nagoya (JP)

(72) Inventors: Osamu Ishigo, Inuyama (JP); Yuichi Tomita, Inuyama (JP); Motohira Yamada, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 13/764,871

(22) Filed: Feb. 12, 2013

(65) Prior Publication Data
US 2013/0251294 A1 Sep. 26, 2013

(30) Foreign Application Priority Data
Feb. 23, 2012 (JP) ................. 2012-036904

(51) Int. Cl.
*F16C 9/04* (2006.01)
(52) U.S. Cl.
USPC .......................................................... 384/288
(58) Field of Classification Search
USPC ................................................ 384/294, 429
See application file for complete search history.

(56) References Cited

U.S. PATENT DOCUMENTS

| 7,281,854 | B2 * | 10/2007 | Terada et al. ............... 384/288 |
| 8,317,402 | B2 * | 11/2012 | Ishigo et al. ............... 384/288 |
| 2005/0196084 | A1 * | 9/2005 | Kitahara et al. ............ 384/288 |
| 2009/0169141 | A1 * | 7/2009 | Ishigo et al. ............... 384/288 |
| 2010/0046869 | A1 * | 2/2010 | Matsuyama ................ 384/288 |
| 2010/0220945 | A1 | 9/2010 | Ishigo et al. |
| 2010/0316313 | A1 | 12/2010 | Ishigo et al. |
| 2011/0058761 | A1 | 3/2011 | Ishigo et al. |
| 2011/0058762 | A1 | 3/2011 | Ishigo et al. |
| 2011/0243486 | A1 * | 10/2011 | Ukai et al. ................. 384/288 |
| 2011/0305410 | A1 | 12/2011 | Otsuki et al. |
| 2012/0008889 | A1 * | 1/2012 | Nakagawa et al. .......... 384/294 |
| 2012/0148179 | A1 * | 6/2012 | Kondo et al. .............. 384/286 |

FOREIGN PATENT DOCUMENTS

| EP | 2253859 A1 | 11/2010 |
| JP | 61-000573 | 1/1986 |
| JP | 04-219521 | 8/1992 |
| JP | 2005-249024 | 9/2005 |

(Continued)

OTHER PUBLICATIONS

Office Action dated Sep. 20, 2013 in corresponding Japanese patent application Serial No. 2012-036904 (four pages).

(Continued)

*Primary Examiner* — Thomas R Hannon
(74) *Attorney, Agent, or Firm* — Harness, Dickey & Pierce, P.L.C.

(57) ABSTRACT

A bearing apparatus for a crankshaft of an internal combustion engine having a main bearing and a connecting rod bearing is provided. The main bearing comprises a pair of semi-cylindrical bearings, only one of which has an oil groove extending in a circumferential direction on an inner circumferential surface thereof. The oil groove is separated from an axial groove formed at a joint portion of the semi-cylindrical bearings by a separation inner circumferential surface of which a length L1 in the circumferential direction is smaller than a length L2 of an inlet opening of a journal portion in the circumferential direction. The connecting rod bearing also comprises a pair of semi-cylindrical bearings, and has axial grooves and crush reliefs with appropriate dimensions at joint portions thereof.

9 Claims, 13 Drawing Sheets

(56) References Cited

FOREIGN PATENT DOCUMENTS

| | | |
|---|---|---|
| JP | 2005-273715 | 10/2005 |
| JP | 2008-095858 | 4/2008 |
| JP | 2010-196871 | 9/2010 |
| JP | 2011-179572 | 9/2011 |

OTHER PUBLICATIONS

European Search Report mailed Jan. 3, 2014 from corresponding European Patent Application No. EP 13156344 (six pages).

* cited by examiner

BEARING APPARATUS FOR CRANKSHAFT OF INTERNAL COMBUSTION ENGINE

BACKGROUND OF THE INVENTION (1) Field of the Invention

The present invention relates to a bearing apparatus for a crankshaft of an internal combustion engine, and more particularly to a bearing apparatus for a crankshaft including a main bearing for supporting a journal portion of the crankshaft in a cylinder block lower portion of the internal combustion engine, and a connecting rod bearing for rotatably supporting a connecting rod on a crankpin.

(2) Description of Related Art

A crankshaft of an internal combustion engine is supported at a journal portion thereof in a cylinder block lower portion of the internal combustion engine via a main bearing formed by a pair of semi-cylindrical bearings. In order to lubricate the main bearing, lubricating oil pumped by an oil pump is fed through an oil gallery which is formed in a wall of the cylinder block and a through port which is formed in a wall of the main bearing into a lubricating oil groove which is formed along an inner circumferential surface of the main bearing. In the crankshaft, a first lubricating oil path is formed to penetrate the journal portion in a diameter direction, and communicates with the lubricating oil groove of the main bearing though both end openings thereof. Furthermore, a second lubricating oil path is formed to branch from the first lubricating oil path and pass through a crank arm section, and communicates with a third lubricating oil path which is formed to penetrate a crankpin in a diameter direction thereof. Accordingly, the lubricating oil having been fed into the lubricating oil groove of the main bearing passes through the first lubricating oil path, the second lubricating oil path and the third lubricating oil path, and thereafter, is supplied to a slide surface between the crankpin and a connecting rod bearing from an end portion opening (lubricating oil outlet which is formed on an outer circumferential surface of the crankpin) of the third lubricating oil path.

The lubricating oil groove of the main bearing is formed on an inner circumferential surface of at least one of a pair of semi-cylindrical bearings throughout an entire length in a circumferential direction thereof (see FIG. 1 of JP-Y2-61-00573). In this case, the lubricating oil which is supplied to the lubricating oil groove of the main bearing from the oil gallery in the cylinder block mainly flows to the end portion in the circumferential direction of the semi-cylindrical bearing in accordance with rotation of the journal portion, and most of the lubricating oil is discharged to an outside of the bearing through an axial groove formed in the joint portion of the pair of semi-cylindrical bearings.

Furthermore, in recent years, in order to reduce the leakage amount of lubricating oil from an end portion in a circumferential direction of a semi-cylindrical bearing in response to miniaturization of a lubricating oil supplying oil pump for the purpose of enhancing fuel efficiency of an internal combustion engine, there is used a main bearing in which the length in the circumferential direction of a lubricating oil groove is configured to be shorter than the entire length in the circumferential direction of the semi-cylindrical bearing, so that at least one of both end portions in the circumferential direction of the lubricating oil groove does not extend to the end portion in the circumferential direction of the semi-cylindrical bearing (namely, does not open at an axial groove) (see JP-Y2-61-00573, JP-A-04-219521, JP-A-2005-249024, J-PA-2011-179572 and JP-A-2008-095858).

BRIEF SUMMARY OF THE INVENTION

The lubricating oil which is fed to the connecting rod bearing from the oil gallery in the cylinder block through the main bearing and the internal lubricating oil paths of the crankshaft is likely to be accompanied by residual foreign matters generated at the time of machining of respective components, for example. The foreign matter is likely to damage a slide surface between the journal portion and the main bearing, and a slide surface between the crankpin and the connecting rod bearing, and therefore, needs to be quickly discharged to the outside from the flow of the lubricating oil.

In the conventional main bearing in which the lubricating oil groove is formed in the inner circumferential surface throughout the entire length in the circumferential direction of the semi-cylindrical bearing, the lubricating oil which is supplied to the lubricating oil groove of the main bearing from the oil gallery in the cylinder block can flow to the end portion in the circumferential direction of the semi-cylindrical bearing, and therefore, the foreign matter accompanying the lubricating oil can be discharged to the outside of the bearing through a gap formed by the axial groove of the main bearing and the journal portion. However, in the case of the main bearing which is configured so that at least one of both end portions in the circumferential direction of the lubricating oil groove does not reach the axial groove, in order to reduce the leakage amount of the lubricating oil from the axial groove in response to miniaturization of the lubricating oil supplying oil pump as described above, not only the lubricating oil but also the foreign matter is difficult to be discharged from the lubricating oil groove of the main bearing, and tends to remain in the vicinity of the end portions in the circumferential direction of the lubricating oil groove.

The foreign matter which remains in the vicinity of the end portions in the circumferential direction of the lubricating oil groove becomes the cause of inducing damage to the slide surface between the journal portion and the main bearing. Further, the foreign matter enters the lubricating oil path in the inside of the crankshaft when the inlet opening of the first lubricating oil path formed on the outer circumferential surface of the journal portion passes the vicinity of the end portion of the lubricating oil groove, and is fed to the slide surface between the crankpin and the connecting rod bearing, where the foreign matter also becomes the cause of inducing damage. As a result, the main bearing which is configured so that at least one of both end portions in the circumferential direction of the lubricating oil groove does not reach the axial groove reduces the life of not only the main bearing itself but also the connecting rod bearing.

Accordingly, an object of the present invention is to provide a bearing apparatus for a crankshaft of an internal combustion engine including: a main bearing having an excellent foreign matter discharging function while reducing a leakage amount of oil, that is, a main bearing capable of preventing a large number of foreign matters from staying at a circumferential end portion of a lubricating oil groove while suppressing outflow of lubricating oil to an axial groove from the circumferential end portion of the lubricating oil groove formed on a bearing inner circumferential surface; and a connecting rod bearing capable of quickly discharging a foreign matter having been fed to the connecting rod bearing through a lubricating oil path in a crankshaft together with the lubricating oil as a result of not being discharged in the main bearing while having an excellent feeding property of the lubricating oil to a bearing slide surface.

In order to attain the above-described objects, according to a first aspect of the present invention, there is provided a bearing apparatus for a crankshaft of an internal combustion engine as follows.

A bearing apparatus for a crankshaft of an internal combustion engine, comprising a main bearing for rotatably supporting a journal portion of the crankshaft, and a connecting rod bearing for rotatably supporting a connecting rod on a crankpin of the crankshaft, the crankshaft having a lubricating oil path formed therein so as to extend from the journal portion to the crankpin, an inlet opening of the lubricating oil path that is formed on an outer circumferential surface of the journal portion, and an outlet opening of the lubricating oil path that is formed on an outer circumferential surface of the crankpin, wherein the main bearing is composed of a pair of first semi-cylindrical bearings, and only one of the first semi-cylindrical bearings comprises an oil groove formed on an inner circumferential surface thereof, the oil groove extends in a circumferential direction at least through a center portion in the circumferential direction of the one first semi-cylindrical bearing, and is disposed so that a center of the width of the oil groove in an axial direction is aligned with a center of the inlet opening of the journal portion, a circumferential end portion of the oil groove does not extend to a circumferential end surface of the one first semi-cylindrical bearing, and accordingly, the inner circumferential surface extends between the circumferential end portion of the oil groove and the circumferential end surface of the one first semi-cylindrical bearing to provide a separation inner circumferential surface, the circumferential end surface to which the oil groove of the one first semi-cylindrical bearing does not extend, and a circumferential end surface of the other first semi-cylindrical bearing that is joined thereto respectively have inclined surfaces extending over the entire length in the axial direction on inner circumferential surface sides thereof, so that an axial groove is formed at a joint portion of the pair of first semi-cylindrical bearings, and the separation inner circumferential surface extends between the axial groove and the oil groove, a length L1 of the separation inner circumferential surface in the circumferential direction is set to be smaller than a length L2 of the inlet opening of the journal portion in the circumferential direction, so that the oil groove can communicate with the axial groove via the inlet opening of the lubricating oil path, the connecting rod bearing is composed of a pair of second semi-cylindrical bearings, and each of the second semi-cylindrical bearings comprises a crush relief extending over the entire length in an axial direction in each circumferential end portion region of an inner circumferential surface thereof, each of circumferential end surfaces of each of the second semi-cylindrical bearings has an inclined surface extending over the entire length in the axial direction on an inner circumferential surface side, so that an axial groove is formed at each joint portion of the pair of second semi-cylindrical bearings, the crush relief is formed by decreasing a bearing wall thickness by a depth RD from the inner circumferential surface side, and the depth RD is maximum at the circumferential end portion of each of the second semi-cylindrical bearings, and gradually decreases toward a center in the circumferential direction to define an end portion of the crush relief on a center side in the circumferential direction on the inner circumferential surface, and a length RL of the crush relief that is defined as a height from a horizontal surface to the end portion of the crush relief on the center side in the circumferential direction when each of the second semi-cylindrical bearings is placed on the horizontal surface in such a manner that both circumferential end surfaces thereof become a lower end surface is 2 to 10 mm, and the depth RD is 0.01 to 0.12 mm at each of the circumferential end portions.

In one embodiment of the present invention, the length L1 of the separation inner circumferential surface in the circumferential direction, and the length L2 of the inlet opening of the journal portion in the circumferential direction satisfy a relational expression as follows:

$$L2-L1 \geq 0.5 \text{ mm}.$$

In another embodiment of the present invention, the length L1 of the separation inner circumferential surface in the circumferential direction, and the length L2 of the inlet opening of the journal portion in the circumferential direction satisfy a relational expression as follows:

$$L1 \geq L2 \times 0.3.$$

More preferably, the length L1 of the separation inner circumferential surface in the circumferential direction, and the length L2 of the inlet opening of the journal portion in the circumferential direction satisfy a relational expression as follows:

$$L1 \geq L2 \times 0.6.$$

In still another embodiment of the present invention, a depth of the axial groove from the inner circumferential surface of the main bearing is 0.1 to 1 mm.

More preferably, the depth of the axial groove from the inner circumferential surface of the main bearing is 0.1 to 0.5 mm.

In still another embodiment of the present invention, a width of the axial oil groove in the circumferential direction on the inner circumferential surface of the main bearing is 0.2 to 2 mm.

In yet another embodiment of the present invention, both circumferential end portions of the oil groove do not extend to the respective circumferential end surfaces of the one semi-cylindrical bearing, and accordingly, the separation inner circumferential surfaces are provided on both sides of the oil groove in the circumferential direction.

In still another embodiment of the present invention, a crush relief is formed on an inner circumferential surface side adjacent to each of the circumferential end surfaces of the pair of the first semi-cylindrical bearings.

More preferably, an end portion of the crush relief on a center side in the circumferential direction of the one first semi-cylindrical bearing is located on a circumferential end surface side with respect to the circumferential end portion of the oil groove.

In yet another embodiment of the present invention, the area of the inlet opening on an outer circumferential surface of the journal portion is larger than the sectional area of the lubricating oil path in the journal portion, and accordingly, a channel transition portion the sectional area of which gradually changes is formed between the inlet opening and the lubricating oil path.

More preferably, a depth dimension of the channel transition portion from an outer circumferential surface of the journal portion is 1 to 2 mm.

In still another embodiment of the present invention, a depth of the axial groove from the inner circumferential surface of the connecting rod bearing is 0.1 to 1 mm, and more preferably 0.1 to 0.5 mm.

In yet another embodiment of the present invention, a width of the axial oil groove in the circumferential direction on the inner circumferential surface of the connecting rod bearing is 0.2 to 2 mm.

In still another embodiment of the present invention, at least one of the second semi-cylindrical bearings has a circumferential groove extending in the circumferential direction from the circumferential end portion, and the circumferential groove is disposed so that a center of the width of the circumferential groove in the axial direction is aligned with a center of the outlet opening of the crankpin.

In still another embodiment of the present invention, the circumferential groove extends from the circumferential end portion toward the center in the circumferential direction within a range of 45 degrees about an axis of rotation of the second semi-cylindrical bearings as a center, and a depth GD from an inner circumferential surface of the circumferential groove may be maximum at the circumferential end portion, and may gradually decrease toward the center in the circumferential direction. Alternatively, the circumferential groove may extend from the circumferential end portion to a circumferential end portion on an opposite side, and may have a predetermined depth GD from an inner circumferential surface. In any case, the depth GD of the circumferential groove is preferably 0.1 to 1 mm at a maximum.

In still another embodiment of the present invention, the width of the circumferential groove is 1 mm or more, and is less than 1.5 times of a diameter of the outlet opening of the connecting rod.

By adopting the configuration of the present invention, the lubricating oil which is supplied into the lubricating oil groove through the through-port formed in the wall of the main bearing is restrained from flowing out from the axial groove of the main bearing by the separation inner circumferential surface which extends between the circumferential end portion of the oil groove and the axial groove, while the foreign matters accompanying the lubricating oil can be properly discharged from the axial groove of the main bearing by the oil groove and the axial groove which will communicate with each other when the inlet opening of the journal portion passes above the separation inner circumferential surface. Further, the foreign matters having been fed to the connecting rod bearing through the lubricating oil path in the crankshaft together with the lubricating oil as a result of not being discharged in the main bearing can be quickly discharged while suppressing excessive outflow of the lubricating oil from the connecting rod bearing.

Other objects, features and advantages of the present invention will become apparent from the following description of the embodiments of the present invention concerning the accompanying drawing.

DETAILED DESCRIPTION OF THE INVENTION

Embodiment 1

Hereinafter, an embodiment of the present invention will be described with reference to the accompanying drawing.

Figure 1:
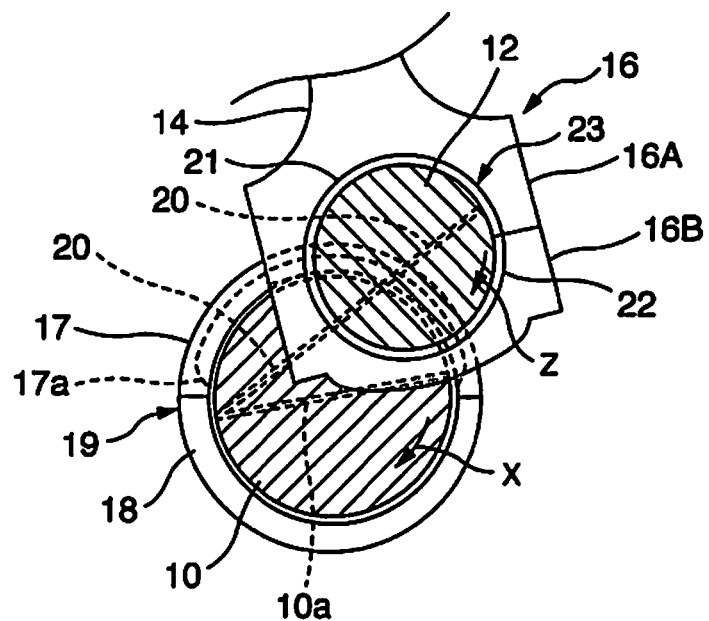
FIG. 1 is a schematic view of a crankshaft of an internal combustion engine cut at a journal portion and a crankpin section respectively.

FIG. 1 is a schematic view of a crankshaft of an internal combustion engine cut at a journal portion and a crankpin section respectively, and shows a journal portion 10, a crankpin 12 and a connecting rod 14. As a positional relationship of the three members in a paper surface depth direction, the journal portion 10 is at a back side of the paper surface, the crankpin 12 is at a front side, and the crankpin 12 is enveloped by a large end portion housing 16 of the connecting rod 14 which carries a piston at the other end.

The journal portion 10 is supported in a cylinder block lower portion (not illustrated) of the internal combustion engine via a main bearing 19 which is configured by a pair of semi-cylindrical bearings 17 and 18. An oil groove 17a which extends in a circumferential direction except for regions near both ends of the main bearing is formed on an inner circumferential surface only in the semi-cylindrical bearing 17 which is located on an upper side in the drawing. The journal portion 10 has a through-hole (lubricating oil path) 10a in a diameter direction thereof, and when the journal portion 10 rotates in an arrow X direction, inlet openings at both ends of the through-hole 10a alternately communicate with the oil groove 17a. Note that if the oil grooves are formed in the semi-cylindrical bearings 17 and 18 on both upper and lower sides, the leakage amount of the lubricating oil from the main bearing 19 increases, and therefore, in the present invention, the oil groove is necessarily formed only in either one of the semi-cylindrical bearings on both upper and lower sides.

A lubricating oil path 20 which penetrates through the journal portion 10, a crank arm not illustrated and the crankpin 12 to communicate with the through-hole 10a is formed in the inside of the crankshaft.

The crankpin 12 is held by the large end portion housing 16 (configured by a connecting rod side large end portion housing 16A and a cap side large end portion housing 16B) of the connecting rod 14 via a connecting rod bearing 23 configured by a pair of semi-cylindrical bearings 21 and 22.

FIGS. 2 to 7 show the details of a pair of semi-cylindrical bearings 17 and 18 constituting the main bearing 19. The semi-cylindrical bearing 17 on the upper side of the paper surface has a front side circumferential end surface 17A disposed at a front side in the rotational direction X of the journal portion 10, and a rear side circumferential end surface 17B disposed on a rear side. The semi-cylindrical bearing 18 on the lower side has a front side circumferential end surface 18B disposed on the front side in the rotational direction X of the journal portion 10, and a rear side circumferential end surface 18A disposed on the rear side. The front side circumferential end surface 17A of the semi-cylindrical bearing 17 abuts on the rear side circumferential end surface 18A of the semi-cylindrical bearing 18, and the front side circumferential end surface 18B of the semi-cylindrical bearing 18 abuts on the rear side circumferential end surface 17B of the semi-cylindrical bearing 17, whereby the main bearing 19 of a cylindrical shape is configured.

The front side circumferential end surface 17A and the rear side circumferential end surface 17B of the semi-cylindrical bearing 17 respectively have inclined surfaces 17C and 17D which are each formed in a chamfered manner throughout an entire length in the axial direction on inner circumferential surface sides, and the front side circumferential end surface 18B and the rear side circumferential end surface 18A of the semi-cylindrical bearing 18 respectively have inclined surfaces 18D and 18C which are similarly formed throughout an entire length in the axial direction on inner circumferential sides, whereby axial grooves 24A and 24B are formed at joint portions of the semi-cylindrical bearings 17 and 18.

Figure 2:
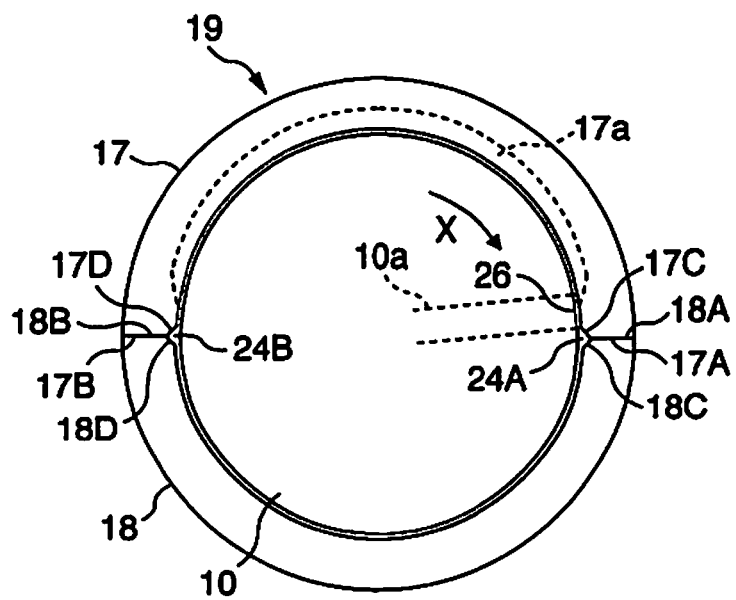
FIG. 2 is a front view of a crankshaft main bearing and the crankshaft according to embodiment 1 of the present invention.
Figure 3:
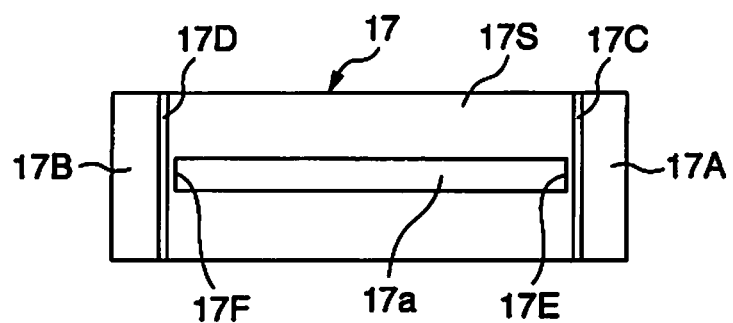
FIG. 3 is a plan view of a semi-cylindrical bearing on an upper side of the main bearing shown in FIG. 2, seen from a bearing inner circumferential surface side.
Figure 4:
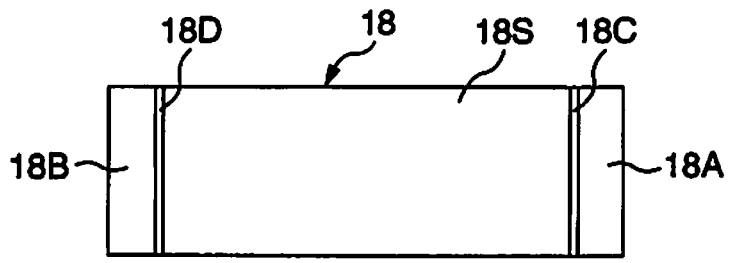
FIG. 4 is a plan view of a semi-cylindrical bearing on a lower side of the main bearing shown in FIG. 2, seen from the bearing inner circumferential surface side.
Figure 5:
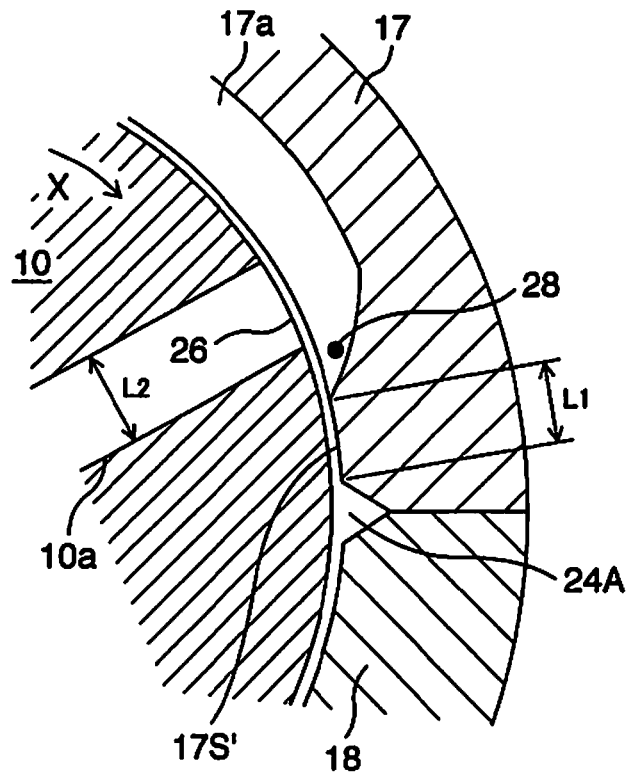
FIG. 5 is an enlarged sectional view of the joint portion of the main bearing and the crankshaft shown in FIG. 2, seen from an axial direction.
Figure 6:
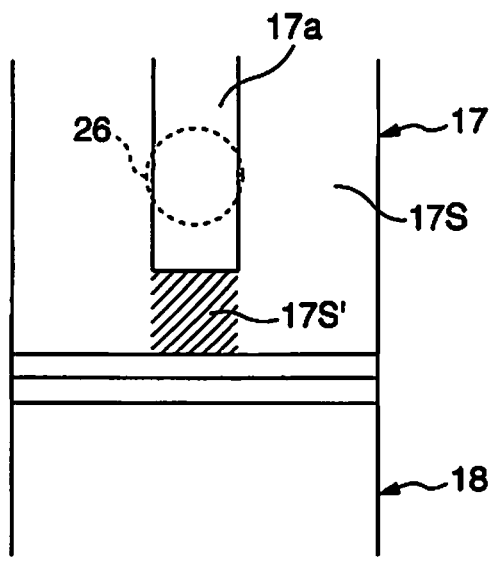
FIG. 6 is a view of the joint portion of the main bearing shown in FIG. 2 seen from a bearing inner circumferential surface side.

As is understood from FIG. 2, the oil groove 17a formed on an inner circumferential surface 17S of the semi-cylindrical bearing 17 has a constant depth in a region including a central portion in the circumferential direction while reducing the depth gradually toward the end portions in the regions in vicinities of the circumferential end portions. Both circumferential end portions 17E and 17F of the oil groove 17a do not extend to the inclined surface 17C and the inclined surface 17D, respectively, and therefore, the inner circumferential surface 17S extends between the end portion 17E and the inclined surface 17C, and between the end portion 17F and the inclined surface 17D (FIGS. 3 and 5). In the present description, a portion of the inner circumferential surface 17S that extends over a length (linear distance) L1 in the circumferential direction so as to separate the circumferential end portion 17E of the oil groove 17a and the inclined surface 17C will be described as a separation inner circumferential portion 17S' (corresponding to a diagonally shaded portion in FIG. 6) hereinafter.

As is understood from FIG. 3, the oil groove 17a is disposed at a center of the width of the semi-cylindrical bearing 17 in the axial direction. A through-port (not illustrated) which penetrates through the semi-cylindrical bearing 17 in a radial direction is formed in a bottom portion of the oil groove 17a, and the lubricating oil is supplied into the oil groove 17a through the through-port from the oil gallery in the wall of the cylinder block. A part of the lubricating oil then flows forward in the rotational direction in the oil groove 17a in accordance with rotation in the arrow X direction of the journal portion 10, and the other part of the lubricating oil flows in an opposite direction from the rotational direction in the oil groove 17a. Further, the semi-cylindrical bearing 17 is disposed so that a center in the width direction of the oil groove 17a aligns with the center of an inlet opening 26 of the lubricating oil path 10a of the journal portion 10 (in FIG. 6, the inlet opening 26 located at the rotational position shown in FIG. 5 is shown by the broken line), and therefore, the lubricating oil supplied into the oil groove 17a can further flow to the connecting rod bearing 23 through the inlet opening 26. The dimension of the inlet opening 26 of the lubricating oil path 10a in the journal portion 10 may vary depending on the specifications of the internal combustion engine, and, for example, in the case of a compact internal combustion engine for a passenger car, the dimension is approximately 5 to 8 mm in diameter.

Figure 8:
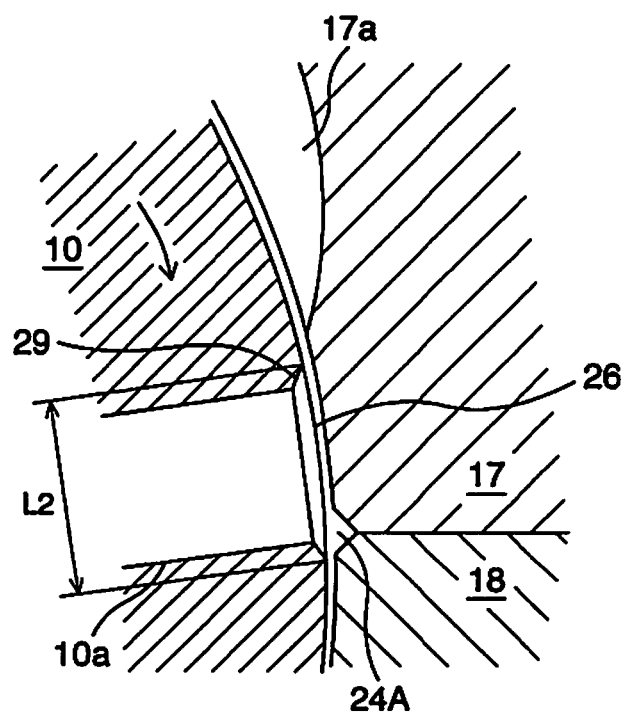
FIG. 8 is an enlarged sectional view of another example of the joint portion of the main bearing and the crankshaft shown in FIG. 2, seen from the axial direction.

The inlet opening 26 is illustrated as having the same sectional area as the lubricating oil path 10a in FIG. 5. However, the inlet opening 26 may have a sectional area larger than the lubricating oil path 10a as shown in FIG. 8 as the result of machining, and may have a circular or elliptical opening shape on the outer circumferential surface of the journal portion 10. When the sectional area of the inlet opening 26 is larger than the sectional area of the lubricating oil path 10a, a channel transition portion 29 the sectional area of which gradually changes in the oil path direction is formed up to a depth of 1 to 2 mm, between the inlet opening 26 and the lubricating oil path 10a. In any case, the inlet opening 26 has a length (linear distance) L2 in the circumferential direction on the outer circumferential surface of the journal portion 10.

Figure 9:
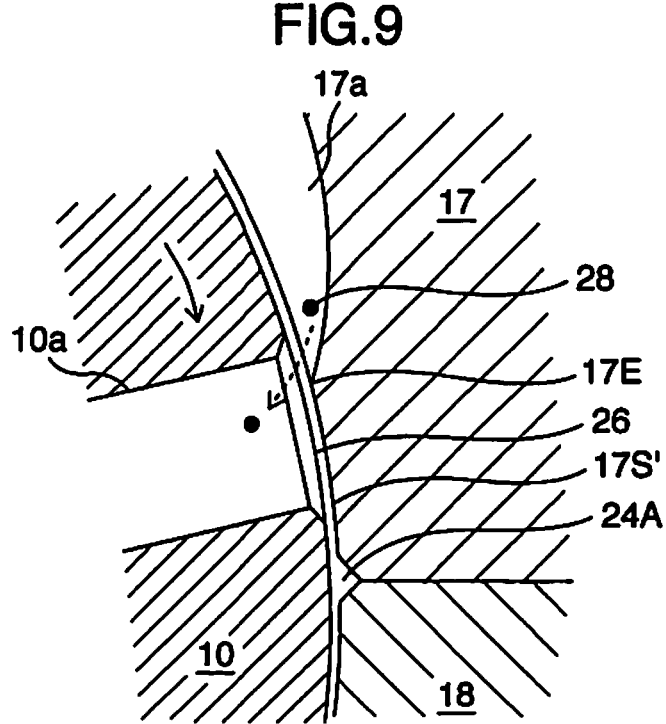
FIG. 9 is an enlarged sectional view of one joint portion seen from the axial direction, for explaining a function of the main bearing shown in FIG. 2.

If a foreign matter 28 is included in the lubricating oil which is supplied to the oil groove 17a, the foreign matter 28 moves to either one of both the circumferential end portions of the oil groove 17a due to the difference in specific gravity between the foreign matter 28 and the lubricating oil (FIG. 5). In the conventional crankshaft main bearing, the foreign matter stays in the circumferential end portion of the oil groove, and becomes the cause of inducing damage to the slide surface between the journal portion and the main bearing, or the foreign matter flows into the lubricating oil path together with the lubricating oil when the inlet opening of the journal portion passes over the circumferential end portion of the oil groove, and becomes the cause of inducing damage to the slide surface between the crankpin and the connecting rod bearing. However, according to the embodiment of the present invention, the length L1 in the circumferential direction of the separation inner circumferential portion 17S' is formed to be smaller than the length L2 in the circumferential direction of the inlet opening 26, and therefore, the foreign matter 28 which enters the lubricating oil path 10a when the inlet opening 26 passes over the end portion 17E of the oil groove 17a in accordance with rotation of the journal portion 10 (see FIG. 9) is discharged to an axial groove 24A when the inlet opening 26 is located on the separation inner circumferential surface 17S' and thereby the oil groove 17a communicates with the axial groove 24A via the inlet opening 26 (see FIG. 10).

Figure 11:
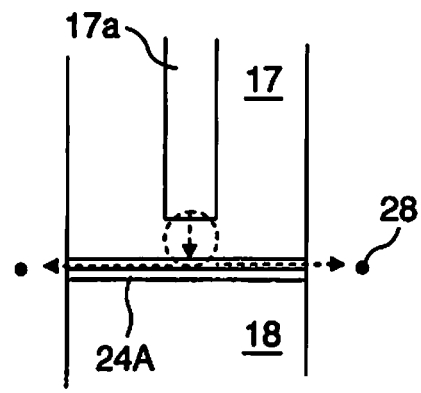
FIG. 11 is a view of one joint portion seen from the bearing inner circumferential surface side, for explaining the function of the main bearing shown in FIG. 2.

More specifically, when the oil groove 17a communicates with the axial groove 24A via the inlet opening 26, (1) centrifugal force F1 due to rotation of the journal portion 10, (2) flow F2 due to the pressure gradient of the lubricating oil in the oil groove 17a and the lubricating oil path 10a, and (3) flow F3 due to the pressure gradient of the lubricating oil in the lubricating oil path 10a and the axial groove 24A simultaneously act on the foreign matter 28 and the lubricating oil inside the lubricating oil path 10a in the vicinity of the inlet opening 26, and the flow of the lubricating oil that is sufficient to move the foreign matter 28 having entered the lubricating oil path 10a to the axial groove 24A is instantly formed. Further, at this instant, the flow in the axial direction of the main bearing 19 is also formed in the axial groove 24A, and helps the foreign matter 28 to be discharged to the outside of the bearing (FIG. 11).

Thereafter, in accordance with rotation of the journal portion 10, the communication between the oil groove 17a and the axial groove 24A is shut off (see FIG. 8, for example), and the flow in the axial direction in the axial groove 24A also decreases. Therefore, outflow of the lubricating oil from the main bearing 19 is restrained.

Figure 12:
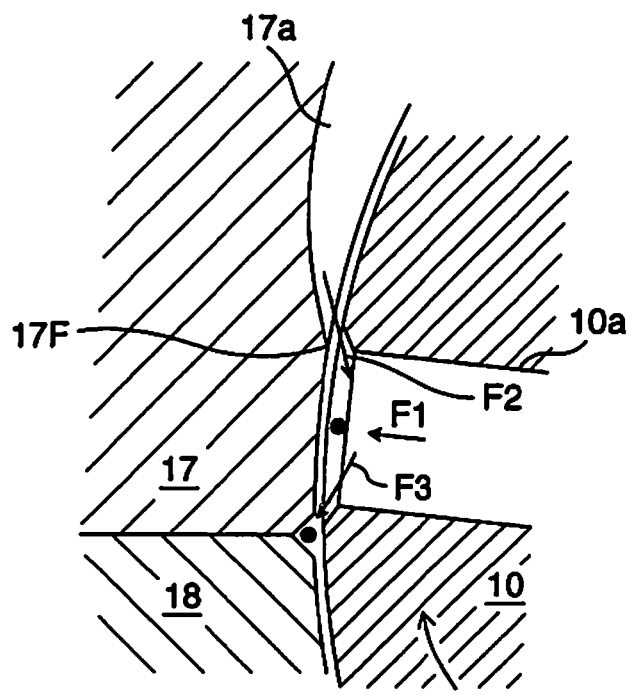
FIG. 12 is an enlarged sectional view of the other joint portion seen from the axial direction, for explaining the function of the main bearing shown in FIG. 2.

Further, according to the present invention, also at the instant when the oil groove 17a and an axial groove 24B communicate with each other via the inlet opening 26 at the rotational direction rear side end portion 17F of the oil groove 17a, the actions F1 to F3 described above work as shown in FIG. 12, and therefore, it is possible to discharge the foreign matter while reducing the leakage amount of the lubricating oil.

Figure 10:
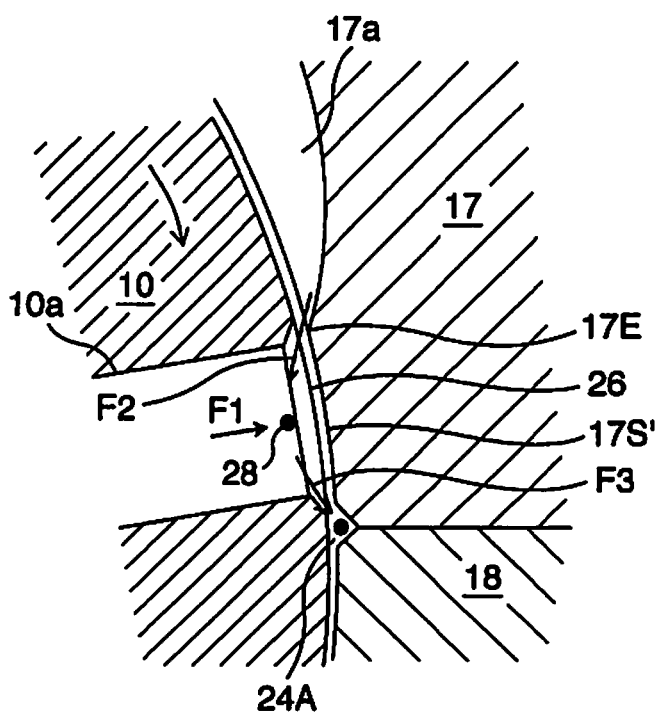
FIG. 10 is an enlarged sectional view of one joint portion seen from the axial direction, for explaining the function of the main bearing shown in FIG. 2.

According to the present invention, the length L1 in the circumferential direction of the separation inner circumferential portion 17S' is required to be smaller than the length L2 in the circumferential direction of the inlet opening 26. This is because in the case of L1≥L2, the inlet opening 26 already does not communicate with the oil groove 17a when the inlet opening 26 starts to communicate with the axial groove 24A, whereby the flow F2 from the oil groove 17a shown in FIG. 10 is not generated, and therefore, the foreign matter 28 having entered the lubricating oil path 10a cannot be forcefully passed to the axial groove 24A.

For the flow of the lubricating oil sufficient to force out the foreign matter 28 having entered the lubricating oil path 10a to the axial groove 24A, the length L1 in the circumferential direction of the separation inner circumferential portion 17S' and the length L2 in the circumferential direction of the inlet opening 26 preferably satisfy the relation of L2−L1≥0.5 mm. In order to prevent the lubricant oil from excessively flowing out when the oil groove 17a communicates with the axial groove 24A, the length L1 in the circumferential direction of the separation inner circumferential portion 17S' and the length L2 in the circumferential direction of the inlet opening 26 preferably satisfy the relation of L1≥L2×0.3, and more preferably, satisfy the relation of L1≥L2×0.6. This is because if the length L1 in the circumferential direction of the separation inner circumferential portion 17S' is too short, a time period in which the oil groove 17a and the axial groove 24A communicate with each other becomes long, the amount of the oil which flows into the axial groove 24A from the end portion 17E of the oil groove 17a, that is, a leakage amount increases, and therefore, the amount of the oil which is fed to the connecting rod bearing 23 decreases.

Figure 7:
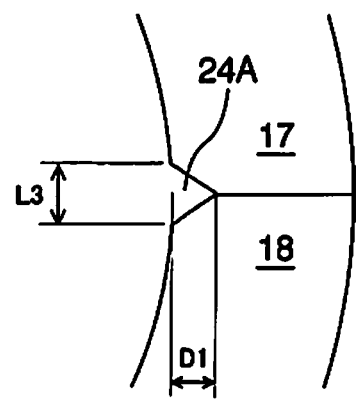
FIG. 7 is an enlarged front view of the joint portion of the main bearing shown in FIG. 2.

A length (linear distance) L3 in the circumferential direction of the axial groove 24A on the inner circumferential surface of the main bearing 19 can be set to be 0.2 to 2 mm, a maximum depth D1 of the axial groove 24A from the inner circumferential surface of the main bearing 19 can be set to be 0.1 to 1 mm, preferably 0.1 to 0.5 mm (FIG. 7). The length L3 in the circumferential direction and the depth D1 of the axial groove 24A may be set to be minimum dimensions which allow the foreign matter to be discharged, in the light of the sizes of the foreign matters included in the lubricating oil (in general, approximately 0.1 mm at the maximum).

When the sectional area of the inlet opening 26 is larger than the sectional area of the lubricating oil path 10a as described above, and the channel transition portions 29 are formed on least both sides in the circumferential direction of the inlet opening 26, the lubricating oil in the oil groove 17a is guided by the inclined surface of the channel transition portion 29 and easily flows into the lubricating oil path 10a when the oil groove 17a and the axial groove 24A communicate with each other, and therefore, the flow F2 (FIG. 10) in the circumferential direction, which forcefully passes the foreign matter 28 toward the axial groove 24A can be made strong. Further, the inclined surface on the front side in the rotational direction of the inlet opening 26 helps the foreign matter 28 enter the axial groove 24A.

Figure 13:
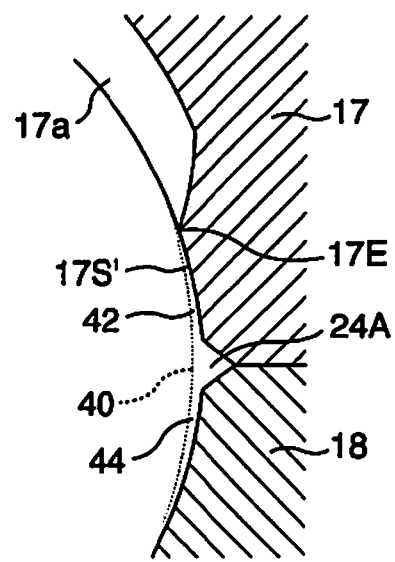
FIG. 13 is an enlarged sectional view of the joint portion of the main bearing shown in FIG. 2 in the case of being provided with a crush relief, seen from the axial direction.
Figure 14:
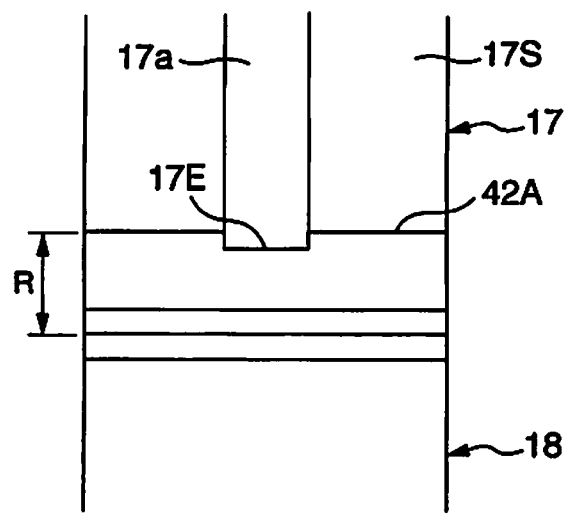
FIG. 14 is a view of the joint portion of the main bearing shown in FIG. 13, seen from the bearing inner circumferential surface side.

The crankshaft main bearing 19 according to the present invention may have crush reliefs 42 and 44 on the bearing inner circumferential surfaces adjacent to the joint portion of the semi-cylindrical bearings 17 and 18. The crush reliefs refer to release spaces 42 and 44 which are formed by decreasing the thickness of a wall portion in the circumferential end portion region of each of the semi-cylindrical bearings 17 and 18 in the radial direction from an original inner circumferential surface 40 (main circular arc) which is concentric with a center of rotation as shown in FIGS. 13 and 14, and the crush reliefs are formed for absorbing a positional displacement and deformation of the circumferential end surfaces of the semi-cylindrical bearings which may occur when, for example, a pair of the semi-cylindrical bearings 17 and 18 are assembled to the journal portion 19 of the crankshaft 10. Accordingly, a curvature center position of the bearing inner circumferential surface 17S in the region R where the crush relief 42 is formed differs from a curvature center position of the bearing inner circumferential surface (main circular arc) in the other region (see SAE J506 (item 3.26 and item 6.4), DIN 1497, section 3.2, JIS D3102). In general, in the case of a compact internal combustion engine bearing for a passenger car, the depth (distance from the original inner circumferential surface to the actual inner circumferential surface) of the crush relief in the circumferential end surface of the split bearing is approximately 0.01 to 0.05 mm.

Figure 15:
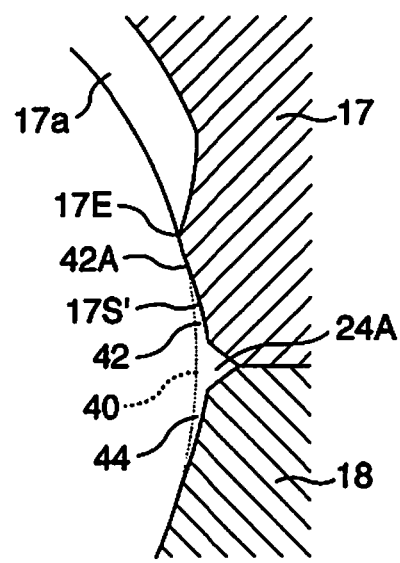
FIG. 15 is an enlarged sectional view of the joint portion of the main bearing shown in FIG. 2 in the case of being provided with a crush relief different from FIG. 13, seen from the axial direction.

In the crush relief 42, the depth is gradually decreased toward a center side in the circumferential direction of the semi-cylindrical bearing 17, and an end portion 42A which defines a region where the crush relief 42 is formed is formed on the bearing inner circumferential surface 17S. The end portion 42A may be located on a center side in the circumferential direction with respect to the circumferential end portion 17E of the oil groove 17a as shown in FIGS. 13 and 14, or may be located on a circumferential end portion side with respect to the circumferential end portion 17E of the oil groove 17a as shown in FIG. 15. This is because the depth of the crush relief 42 is sufficiently small as compared with the depths of the oil groove 17a and the axial groove 24A, and therefore, the difference between the original inner circumferential surface 40 and the actual inner circumferential surface 17S' does not influence the discharge action of a foreign matter. However, when the circumferential end portion 42A of the crush relief 42 is located on the center side in the circumferential direction with respect to the position of the circumferential end portion 17E of the oil groove 17a, a gap which is formed between the separation inner circumferential portion 17S' and the outer circumferential surface of the journal portion 10 slightly increases, and therefore, the amount of oil flowing to the axial groove 24A from the oil groove 17a, that is, the amount of leakage from the main bearing 19 slightly increases. Accordingly, from the viewpoint of reducing the leakage amount of the lubricating oil, the end portion 42A of the crush relief 42 is preferably located on the circumferential end portion side with respect to the circumferential end portion 17E of the oil groove 17a as shown in FIG. 15.

In other words, in the case of the semi-cylindrical bearing 17 in which the crush relief 42 shown in FIG. 15 is formed, even if the inlet opening 26 of the journal portion 10 has the length L2 in the circumferential direction that allows the oil groove 17a to communicate only with the region R in which the crush relief 42 is formed, a foreign matter is not discharged, but stays at the end portion of the oil groove 17a. This is because in the initial stage at which the inlet opening 26 and the crush relief 42 communicate with each other, the lubricating oil especially flows into a portion with a small capacity of the crush relief 42 and fills the portion, whereby a pressure difference of the lubricating oil path 10a and the crush relief 42 becomes small, and the flow F3 due to the pressure gradient hardly occurs, in addition to the aforementioned reason that the crush relief 42 is not deep enough to allow foreign matters to enter the crush relief 42. Consequently, according to the present invention, the dimensions of the inlet opening 26 and the separation inner circumferential surface 17S' need to be determined so that the oil groove 17a communicates with the axial oil groove 24A or 24B.

Next, with reference to FIG. 16, the connecting rod bearing 23 of the present invention will be described.

The lubricating oil, which flows into the through-hole 10a in the journal portion 10 via the main bearing 19 as described above, subsequently passes through the lubricating oil path 20 in the crankshaft and a through-hole 12a in the crankpin 12, and is finally supplied to a slide surface between the crankpin 12 and the connecting rod bearing 23 from an outlet opening 56 formed on an outer circumferential surface of the crankpin 12. However, the foreign matters 28, which are not discharged in the main bearing 19 of the present invention, may be included in the lubricating oil, and the foreign matters 28 are discharged into crush relief 62 and 64 formed adjacently to a joint portion of the semi-cylindrical bearings 21 and 22, due to a large pressure gradient generated by rapid expansion of the oil clearance at the time that the outlet opening 56 communicates with the crush reliefs 62 and 64.

Figure 16:
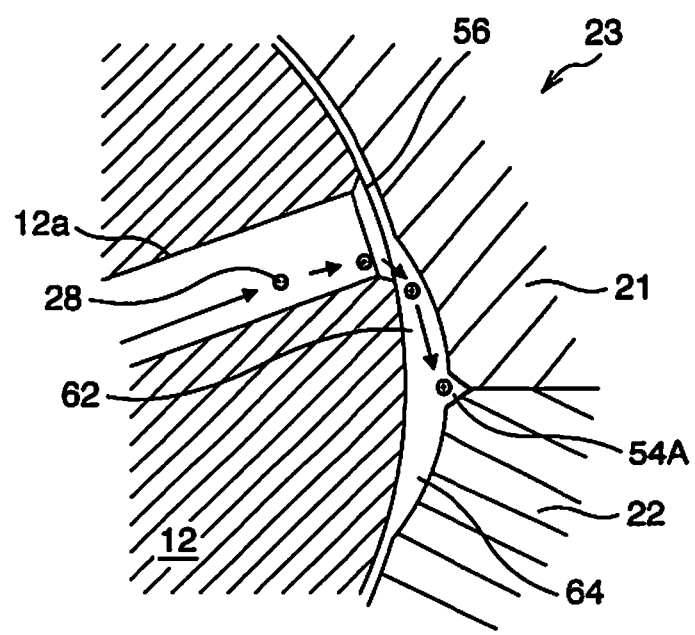
FIG. 16 is an enlarged sectional view of a joint portion of a connecting rod bearing and the crankpin shown in FIG. 1, seen from the axial direction.

As shown in FIG. 16, the crush reliefs 62 and 64 communicate with an axial groove 54A formed at a joint portion of the semi-cylindrical bearings 21 and 22, and therefore, the foreign matter 28 which is discharged into the crush reliefs 62 and 64 thereafter moves in the axial direction in the axial groove 54A and is discharged from the connecting rod bearing 23.

Figure 17:
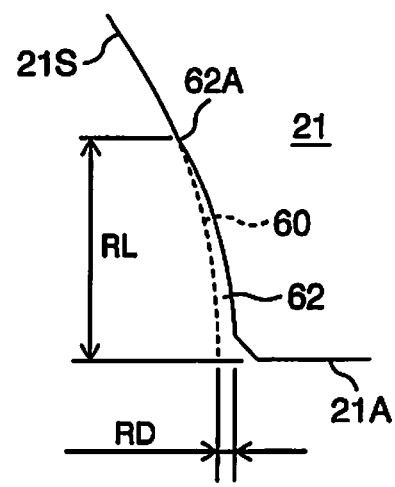
FIG. 17 is an enlarged front view showing a crush relief formed in a semi-cylindrical bearing on an upper side of the connecting rod bearing shown in FIG. 1.

In the conventional connecting rod bearing, the dimension of the crush relief is small, and therefore, the foreign matter 28 which is discharged from the outlet opening 56 is caught in the crush relief, and cannot be smoothly discharged. However, the present invention adopts specific crush relief dimensions in which a depth RD of the crush relief 62 corresponding to a thickness reduction amount from an original inner circumferential surface 60 (main circular arc) of the semi-cylindrical bearing 21 which is concentric with a center of rotation of the connecting rod bearing 23 is 0.01 to 0.12 mm, preferably 0.05 to 0.10 mm in a circumferential end portion 21A of the semi-cylindrical bearing 21, and a length RL of the crush relief defined as a height from a horizontal surface when both circumferential end portions of the semi-cylindrical bearing 21 are placed on the horizontal surface as a lower end surface is 2 to 10 mm, more preferably 2 to 5 mm, as shown in FIG. 17, and thereby, enhances a foreign matter discharging function while suppressing excessive outflow of the lubricating oil in the connecting rod bearing.

Figure 18:
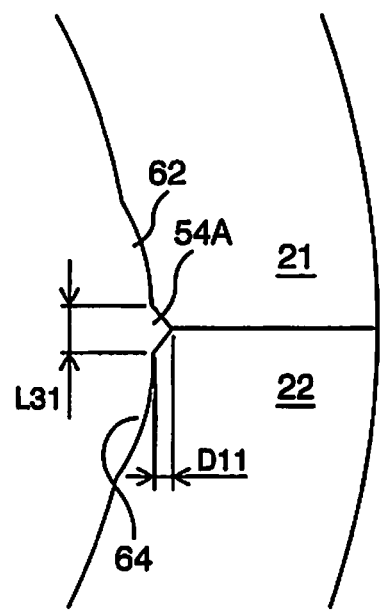
FIG. 18 is an enlarged front view of the joint portion of the connecting rod bearing shown in FIG. 1.

As shown in FIG. 18, a length (linear distance) L31 in a circumferential direction of the axial groove 54A on the inner circumferential surface of the connecting rod bearing 23 can be set to be 0.2 to 2 mm, and a maximum depth D11 of the axial groove 54A from the inner circumferential surface of the connecting rod bearing 23 can be set to be 0.1 to 1 mm. The axial groove 54A aims to discharge the same foreign matters, and therefore, these dimensions are the same as the dimensions of the axial groove 24A of the main bearing 19.

Figure 19:
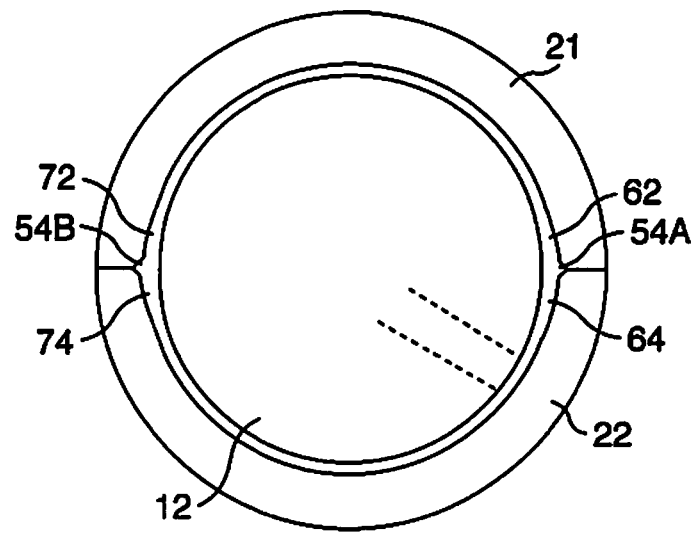
FIG. 19 is a front view of the connecting rod bearing and the crankpin shown in FIG. 1.

According to the present invention, in order to ensure the foreign matter discharging function, the above described axial grooves 54A and 54B are formed at both the joint portions of the semi-cylindrical bearings 21 and 22, and the above described crush reliefs 62, 64, 72 and 74 are formed on all the inner circumferential surfaces of the semi-cylindrical bearings 21 and 22 adjacent to both the joint portions (FIG. 19).

Figure 20:
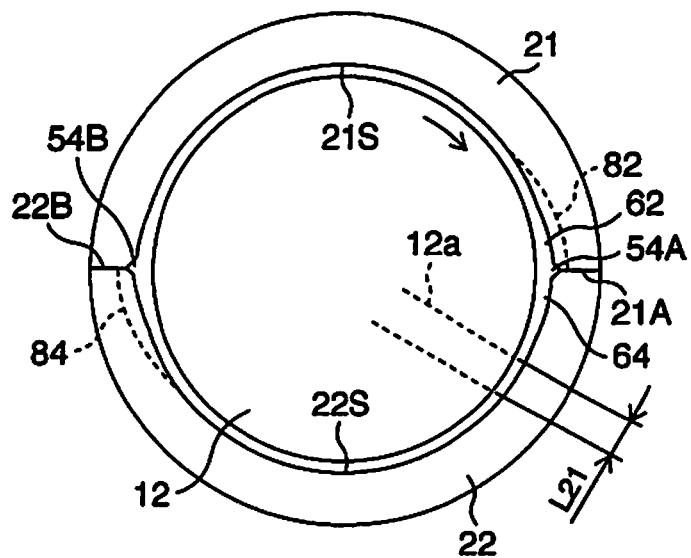
FIG. 20 is a front view of the connecting rod bearing having circumferential grooves only in circumferential end portion regions and the crankpin.
Figure 21:
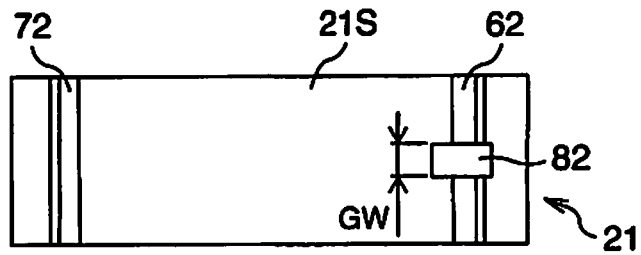
FIG. 21 is a plan view of the semi-cylindrical bearing on the upper side of the connecting rod bearing shown in FIG. 20, seen from a bearing inner circumferential surface side.
Figure 22:
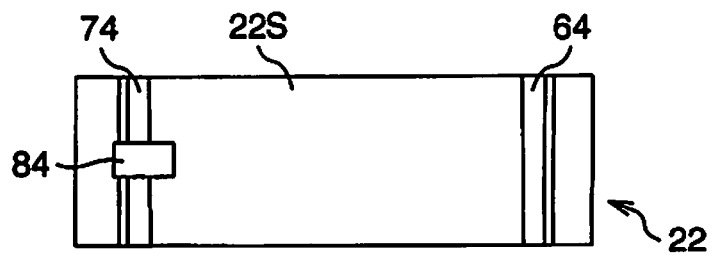
FIG. 22 is a plan view of a semi-cylindrical bearing on a lower side of the connecting rod bearing shown in FIG. 20, seen from the bearing inner circumferential surface side.

Further, the connecting rod bearing 23 may have circumferential grooves 82 and 84 formed on an inner circumferential surface of at least one of circumferential end portion regions of at least one of the semi-cylindrical bearings 21 and 22, in order to assist in discharge of the foreign matter 28 from the outlet opening 56 of the crankpin 12, and in order to guide the discharged foreign matter 28 to the axial grooves 54A and 54B reliably. FIGS. 20 to 22 show an embodiment in which the respective semi-cylindrical bearings 21 and 22 have the circumferential grooves 82 and 84 only at circumferential end portions in the front side in the rotational direction of the crankpin 12, but it should be understood that the respective semi-cylindrical bearings 21 and 22 may have circumferential grooves in both circumferential end portion regions thereof as described above.

Figure 23:
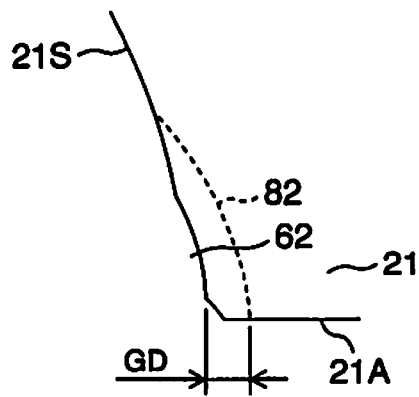
FIG. 23 is an enlarged front view showing a circumferential groove formed in the semi-cylindrical bearing on the upper side of the connecting rod bearing shown in FIG. 20.

The circumferential grooves 82 and 84 preferably extend toward a center in the circumferential direction within a range of 45 degrees around a center axis of the semi-cylindrical bearings 21 and 22 from the circumferential end portions 21A and 22B. This contributes to securement of slide areas in the center regions in the circumferential direction of the semi-cylindrical bearings 21 and 22. However, in order to guide foreign matters reliably, lengths in the circumferential direction of the circumferential grooves 82 and 84 are preferably 0.5 times as large as a diameter L21 of the outlet opening 56, or larger. In any case, a depth GD of the circumferential groove 82 from an inner circumferential surface 21S can be set to be 0.1 to 1 mm in the circumferential end portion 21A, and gradually decreases toward the center in the circumferential direction as shown in FIG. 23.

The circumferential grooves 82 and 84 are disposed so that centers of their widths GW in the axial direction conform to the center of the outlet opening 12a of the crankpin 12 (see FIGS. 20 and 21). The widths GW of the circumferential grooves 82 and 84 can be set to be 1 mm or more in order to promote discharge of the foreign matters, but in order to prevent excessive outflow of the lubricating oil and decrease of the slide area, the width GW is preferably less than 1.5 times as large as the diameter L21 of the outlet opening 56.

Figure 24:
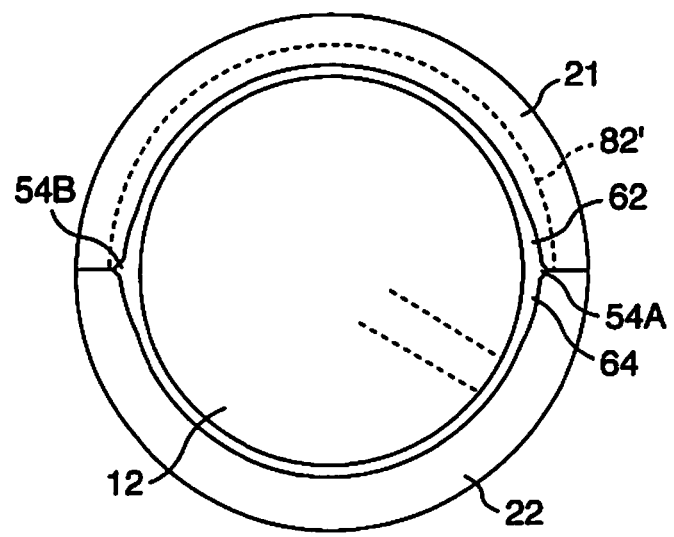
FIG. 24 is a front view of the connecting rod bearing having a circumferential groove extending throughout an entire length in the circumferential direction and the crankpin.
Figure 25:
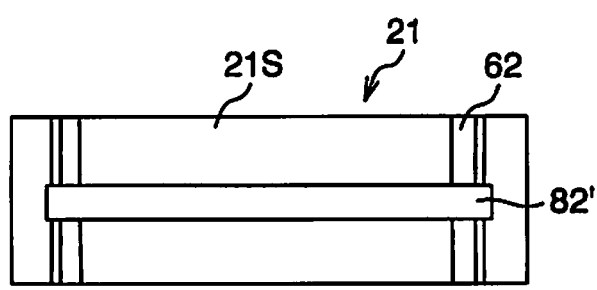
FIG. 25 is a plan view of the semi-cylindrical bearing on the upper side of the connecting rod bearing shown in FIG. 24, seen from the bearing inner circumferential surface side.

Note that the semi-cylindrical bearings 21 and 22 may have a circumferential groove 82' extending on the inner circumferential surfaces 21S and 22S throughout an entire length in the circumferential direction, in place of the circumferential grooves 82 and 84 described above. FIGS. 24 and 25 show an embodiment in which only one semi-cylindrical bearing 21 has a circumferential groove 82' extending throughout an entire length in the circumferential direction, and a similar circumferential groove may be formed also in the other semi-cylindrical bearing 22, or the circumferential groove 84 extending only in the circumferential end portion region as described above may be formed. When a plurality of circumferential grooves are formed, the lengths in the circumferential direction and the depths of the grooves do not have to be always made the same, and the depths and the widths of the circumferential grooves may vary along the circumferential direction.

Embodiment 2

Figure 26:
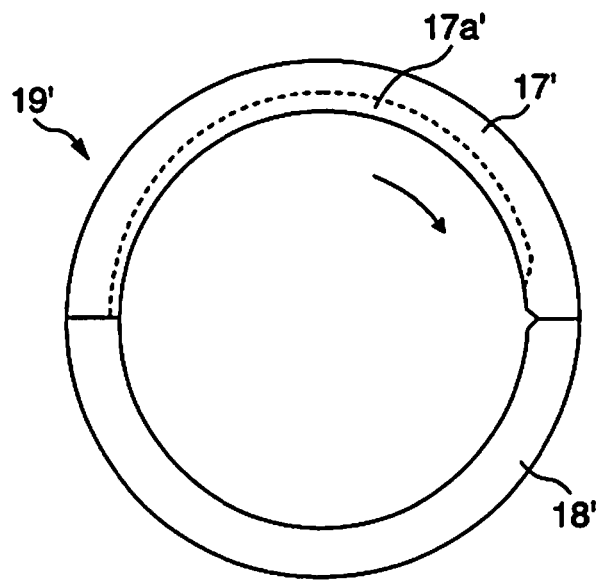
FIG. 26 is a front view of a crankshaft main bearing according to embodiment 2 of the present invention.

FIG. 26 shows a crankshaft main bearing 19' according to embodiment 2 of the present invention. As is understood from the drawing, an axial groove is formed only in a joint portion on the right side of the paper surface, among joint portions of semi-cylindrical bearings 17' and 18', and an oil groove 17a' which is formed at the semi-cylindrical bearing 17' on the upper side of the paper surface has the configuration of the present invention described above only on a front side in the rotational direction of the journal portion. Namely, the oil groove 17a' has a depth gradually decreased toward an end portion on the front side in the rotational direction, and thereby forms a separation inner circumferential surface on the front side in the rotational direction, while the oil groove 17a' keeps a constant depth from a region including a center portion in the circumferential direction to an end portion on a rear side in the rotational direction, and thereby extends up to the circumferential end surface of the semi-cylindrical bearing 17'.

Embodiment 3

Figure 27:
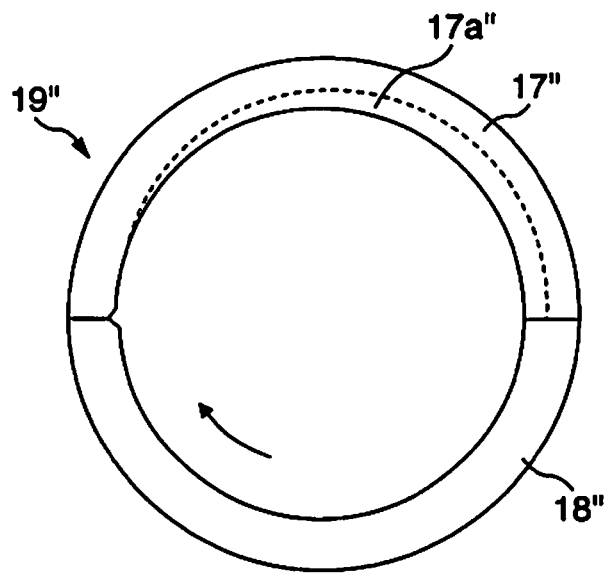
FIG. 27 is a front view of a crankshaft main bearing according to embodiment 3 of the present invention.

FIG. 27 shows a crankshaft main bearing 19" according to embodiment 3 of the present invention. As is understood from the drawing, an axial groove is formed only in a joint portion on the left side of the paper surface, among joint portions of semi-cylindrical bearings 17" and 18", and an oil groove 17a" which is formed at the semi-cylindrical bearing 17" on the upper side of the paper surface has the configuration of the present invention described above only on a rear side in the rotational direction of the journal portion. Namely, the oil groove 17a" extends in the circumferential direction so as to decrease a depth gradually toward an end portion on a rear side in the rotational direction from an end surface on a front side in the rotational direction of the semi-cylindrical bearing 17", and thereby forms a separation inner circumferential surface only on the rear side in the rotational direction.

The above description is provided for showing the embodiments, but it is obvious for a person skilled in the art that the present invention is not limited to the embodiments, and various modifications and corrections can be made within the scope of the spirit and the accompanying claims of the present invention. For example, in each of the above described embodiments, the oil groove of the main bearing is formed in the semi-cylindrical bearing on the upper side. However, the oil groove may be formed only in the semi-cylindrical bearing on the lower side. Further, the oil groove may be formed in such a manner that the depth is maximum at the center portion in the circumferential direction of the semi-cylindrical bearing, and gradually decreases toward both end portions in the circumferential direction of the semi-cylindrical bearing, and the sectional shape orthogonal to the longitudinal direction of the oil groove may be in an optional shape such as a semicircular shape, and a triangular shape besides the rectangular shape.

The invention claimed is:

1. A bearing apparatus for a crankshaft of an internal combustion engine, comprising a main bearing for rotatably supporting a journal portion of the crankshaft, and a connecting rod bearing for rotatably supporting a connecting rod on a crankpin of the crankshaft, the crankshaft having a lubricating oil path formed therein so as to extend from the journal portion to the crankpin, an inlet opening of the lubricating oil path that is formed on an outer circumferential surface of the journal portion, and an outlet opening of the lubricating oil path that is formed on an outer circumferential surface of the crankpin, wherein the main bearing is composed of a pair of first semi-cylindrical bearings, and only one of the first semi-cylindrical bearings comprises an oil groove formed on an inner circumferential surface thereof, the oil groove extends in a circumferential direction at least through a center portion in the circumferential direction of the one first semi-cylindrical bearing, and is disposed so that a center of the width of the oil groove in an axial direction is aligned with a center of the inlet opening of the journal portion, a circumferential end portion of the oil groove does not extend to a circumferential end surface of the one first semi-cylindrical bearing, and accordingly, the inner circumferential surface extends between the circumferential end portion of the oil groove and the circumferential end surface of the one first semi-cylindrical bearing to provide a separation inner circumferential surface, the circumferential end surface to which the oil groove of the one first semi-cylindrical bearing does not extend, and a circumferential end surface of the other first semi-cylindrical bearing that is joined thereto respectively have inclined surfaces extending over the entire length in the axial direction on inner circumferential surface sides thereof, so that an axial groove is formed at a joint portion of the pair of first semi-cylindrical bearings, and the separation inner circumferential surface extends between the axial groove and the oil groove, a length L1 of the separation inner circumferential surface in the circumferential direction is set to be smaller than a length L2 of the inlet opening of the journal portion in the circumferential direction, so that the oil groove can communicate with the axial groove via the inlet opening of the lubricating oil path, the connecting rod bearing is composed of a pair of second semi-cylindrical bearings, and each of the second semi-cylindrical bearings comprises a crush relief extending over the entire length in an axial direction in each circumferential end portion region of an inner circumferential surface thereof, each of circumferential end surfaces of each of the second semi-cylindrical bearings has an inclined surface extending over the entire length in the axial direction on an inner circumferential surface side, so that an axial groove is formed at each joint portion of the pair of second semi-cylindrical bearings, the crush relief is formed by decreasing a bearing wall thickness by a depth RD from the inner circumferential surface side, and the depth RD is maximum at the circumferential end portion of each of the second semi-cylindrical bearings, and gradually decreases toward a center in the circumferential direction to define an end portion of the crush relief on a center side in the circumferential direction on the inner circumferential surface, and a length RL of the crush relief that is defined as a height from a horizontal surface to the end portion of the crush relief on the center side in the circumferential direction when each of the second semi-cylindrical bearings is placed on the horizontal surface in such a manner that both circumferential end surfaces thereof become a lower end surface is 2 to 10 mm, and the depth RD is 0.01 to 0.12 mm at each of the circumferential end portions.

2. The bearing apparatus according to claim 1, wherein a depth of the axial groove from the inner circumferential surface of the connecting rod bearing is 0.1 to 1 mm.

3. The bearing apparatus according to claim 1, wherein a width in the circumferential direction of the axial oil groove on the inner circumferential surface of the connecting rod bearing is 0.2 to 2 mm.

4. The bearing apparatus according to claim 1, wherein at least one of the second semi-cylindrical bearings has a circumferential groove extending in the circumferential direction from the circumferential end portion, and the circumferential groove is disposed so that a center of the width thereof in the axial direction is aligned with a center of the outlet opening of the crankpin.

5. The bearing apparatus according to claim 4, wherein the circumferential groove extends from the circumferential end portion toward the center in the circumferential direction within a range of 45 degrees about an axis of rotation of the second semi-cylindrical bearings as a center, and a depth GD of the circumferential groove from the inner circumferential surface is maximum at the circumferential end portion, and gradually decreases toward the center in the circumferential direction.

6. The bearing apparatus according to claim 5, wherein the depth GD of the circumferential groove is 0.1 to 1 mm at a maximum.

7. The bearing apparatus according to claim 4, wherein the circumferential groove extends from the circumferential end portion to a circumferential end portion on an opposite side, and has a predetermined depth GD from the inner circumferential surface.

8. The bearing apparatus according to claim 7, wherein the depth GD of the circumferential groove is 0.1 to 1 mm at a maximum.

9. The bearing apparatus according to claim 4, wherein the width of the circumferential groove is 1 mm or more, and is less than 1.5 times of a diameter of the outlet opening of the connecting rod.

* * * * *